US009435124B2

United States Patent
Bezubic, Jr.

(10) Patent No.: US 9,435,124 B2
(45) Date of Patent: Sep. 6, 2016

(54) CEMENTITIOUS EXTERIOR SHEATHING PRODUCT HAVING IMPROVED INTERLAMINAR BOND STRENGTH

(75) Inventor: William Paul Bezubic, Jr., Marshall, MI (US)

(73) Assignee: PLYCEM USA, INC., Alpharetta, GA (US)

( * ) Notice: Subject to any disclaimer, the term of this patent is extended or adjusted under 35 U.S.C. 154(b) by 0 days.

(21) Appl. No.: 13/439,542

(22) Filed: Apr. 4, 2012

(65) Prior Publication Data
US 2012/0192517 A1 Aug. 2, 2012

Related U.S. Application Data

(60) Division of application No. 11/564,517, filed on Nov. 29, 2006, now Pat. No. 8,192,658, which is a division of application No. 10/342,529, filed on Jan. 15, 2003, now Pat. No. 7,155,866, which is a continuation-in-part of application No. 10/288,189, filed on Nov. 5, 2002, now Pat. No. 7,028,436.

(51) Int. Cl.
*E04F 13/072* (2006.01)
*E04D 1/16* (2006.01)
(Continued)

(52) U.S. Cl.
CPC .............. *E04D 1/16* (2013.01); *B28B 1/526* (2013.01); *B28B 1/527* (2013.01); *B28B 7/46* (2013.01);
(Continued)

(58) Field of Classification Search
CPC ....... E04F 15/04; E04F 13/141; E04F 13/16; E04F 15/10; B28B 1/526; B28B 1/527; B28B 7/46; B32B 13/02; E04C 2/04; E04D 1/10; E04D 1/16; C04B 2111/00612; C04B 2111/00637; C04B 2111/1018; C04B 28/04; C04B 41/009; C04B 41/483; C04B 41/63; Y02W 30/97

USPC .............. 52/287.1, 288.1, 309.17, 443, 578, 52/748.1, 796.1
See application file for complete search history.

(56) References Cited

U.S. PATENT DOCUMENTS

| 279,011 A | 6/1883 | Phelps |
|---|---|---|
| 776,344 A | 11/1904 | Nielson |

(Continued)

FOREIGN PATENT DOCUMENTS

| CA | 721719 | 11/1965 |
|---|---|---|
| CA | 794590 | 9/1968 |

(Continued)

OTHER PUBLICATIONS

Marikunte, et al., Statistical Evaluation of Long-Term Durability Characteristics of Cellulose Fiber Reinforced Cement Composites, ACI Materials Journal/Nov.-Dec. 1994.

(Continued)

*Primary Examiner* — Charles A Fox
*Assistant Examiner* — Joseph J Sadlon
(74) *Attorney, Agent, or Firm* — RatnerPrestia

(57) ABSTRACT

The present invention provides exterior building products, such as roofing and siding, shake, shingles, siding, sheathing, panels, planks, vertical siding, soffit panels, fencing, decking, fascia, corner posts, column corners and trim boards in which a plurality of cementitious layers are provided with an improved interlaminar bond by employing a resinous bond promoter, a rheological agent, mechanical means to distribute fibers in a direction which is perpendicular to the machine direction so as to bridge between layers in the product, or a combination thereof. These techniques help to increase interlaminar bond strength to improve the mechanical properties of the product. When certain resinous bond promoters are used, the additional benefits of water absorption resistance and pigmentation throughout the product can be provided with minimal expense. Improvements in interlaminar bond strength of about 10 46% were observed with a percent elongation improvement of about 7%.

8 Claims, 5 Drawing Sheets

(51) Int. Cl.
  *B28B 1/52* (2006.01)
  *B28B 7/46* (2006.01)
  *B32B 13/02* (2006.01)
  *C04B 28/04* (2006.01)
  *C04B 41/00* (2006.01)
  *C04B 41/48* (2006.01)
  *C04B 41/63* (2006.01)
  *E04C 2/04* (2006.01)
  *E04D 1/10* (2006.01)
  *E04F 13/14* (2006.01)
  *E04F 13/16* (2006.01)
  *E04F 15/10* (2006.01)
  *B44F 9/02* (2006.01)
  *B05D 5/00* (2006.01)
  *B05D 3/00* (2006.01)
  *C04B 111/00* (2006.01)
  *C04B 111/10* (2006.01)

(52) U.S. Cl.
  CPC ............. *B32B 13/02* (2013.01); *C04B 28/04* (2013.01); *C04B 41/009* (2013.01); *C04B 41/483* (2013.01); *C04B 41/63* (2013.01); *E04C 2/04* (2013.01); *E04D 1/10* (2013.01); *E04F 13/141* (2013.01); *E04F 13/16* (2013.01); *E04F 15/10* (2013.01); *C04B 2111/00612* (2013.01); *C04B 2111/00637* (2013.01); *C04B 2111/1018* (2013.01); *Y02W 30/97* (2015.05)

(56) References Cited

U.S. PATENT DOCUMENTS

| | | | |
|---|---|---|---|
| 1,447,567 A | 3/1923 | Overbury | |
| 1,495,070 A | 5/1924 | Finley | |
| 1,732,403 A | 10/1929 | Harris et al. | |
| 1,787,163 A | 12/1930 | New | |
| 1,872,185 A | 8/1932 | Reade | |
| 1,959,960 A | 5/1934 | Magrath | 18/48 |
| 1,976,947 A | 10/1934 | Krauss | |
| 2,045,482 A | 6/1936 | Maier | |
| 2,089,005 A | 8/1937 | Sherman et al. | |
| 2,142,181 A | 1/1939 | Croce | 108/7 |
| 2,149,741 A | 3/1939 | Miles | 20/5 |
| 2,171,010 A | 8/1939 | Schuetz et al. | 108/7 |
| 2,171,155 A | 8/1939 | Wright, Jr. | |
| 2,174,098 A | 9/1939 | Stein | 108/7 |
| 2,187,203 A | 1/1940 | Johnston | 108/8 |
| 2,199,760 A | 5/1940 | Schuetz | 108/7 |
| 2,206,042 A | 7/1940 | Novak | 154/2 |
| 2,238,017 A | 4/1941 | Duncan | 154/2 |
| 2,255,736 A | 9/1941 | Odell | |
| 2,560,521 A | 7/1951 | Camp et al. | 154/86 |
| 2,633,441 A | 3/1953 | Guttress | 154/87 |
| 2,850,890 A * | 9/1958 | Rubenstein | 264/228 |
| 2,851,873 A | 9/1958 | Wheeler-Nicholson | |
| 2,951,001 A * | 8/1960 | Rubenstein | 428/142 |
| 2,954,302 A | 9/1960 | Gorman, Jr. | 117/60 |
| 3,185,297 A | 5/1965 | Rutledge | 206/59 |
| 3,284,980 A | 11/1966 | Dinkel | 52/600 |
| 3,289,371 A | 12/1966 | Pearson et al. | 52/338 |
| 3,391,037 A | 7/1968 | McNulty | 156/71 |
| 3,509,020 A | 4/1970 | Gelsomino | |
| 3,607,486 A | 9/1971 | Jacks et al. | 156/41 |
| 3,608,261 A * | 9/1971 | French et al. | B28B 1/526 264/241 |
| 3,695,960 A * | 10/1972 | Richter | 156/89.11 |
| 3,736,715 A * | 6/1973 | Krumwiede | 52/309.11 |
| 3,742,668 A | 7/1973 | Oliver | |
| 3,766,003 A | 10/1973 | Schuller et al. | 162/156 |
| 3,830,687 A | 8/1974 | Re et al. | 161/168 |
| 3,868,300 A | 2/1975 | Wheeler | 164/124 |
| 3,870,777 A | 3/1975 | Jakel | |
| 3,927,501 A | 12/1975 | Allen et al. | 52/555 |
| 3,929,947 A | 12/1975 | Schwartz et al. | 264/42 |
| 3,935,021 A | 1/1976 | Greve et al. | 106/111 |
| 3,941,632 A | 3/1976 | Swedenberg et al. | 156/71 |
| 3,944,698 A | 3/1976 | Dierks et al. | 428/219 |
| 3,947,398 A | 3/1976 | Williams | 260/29.6 |
| 3,954,555 A | 5/1976 | Kole et al. | |
| 3,969,567 A | 7/1976 | Occleshaw et al. | |
| 3,985,610 A | 10/1976 | Pomerhn et al. | |
| 3,993,822 A | 11/1976 | Knauf et al. | 428/213 |
| 4,015,391 A | 4/1977 | Epstein et al. | 52/520 |
| 4,020,237 A | 4/1977 | Von Hazmburg | 428/535 |
| 4,040,851 A | 8/1977 | Ziegler | |
| 4,047,355 A | 9/1977 | Knorr | 52/738 |
| 4,065,333 A | 12/1977 | Lawlis et al. | 156/40 |
| 4,065,597 A | 12/1977 | Gillespie | 428/285 |
| 4,073,997 A | 2/1978 | Richards et al. | 428/285 |
| 4,112,174 A | 9/1978 | Hannes et al. | 428/220 |
| 4,128,699 A | 12/1978 | Kole et al. | 428/498 |
| 4,135,029 A | 1/1979 | Pfeffer | 428/284 |
| 4,148,781 A | 4/1979 | Narukawa et al. | 260/42.51 |
| 4,181,767 A | 1/1980 | Steinau | 428/219 |
| 4,184,906 A * | 1/1980 | Young | 156/299 |
| 4,187,130 A | 2/1980 | Kautz | 156/42 |
| 4,194,946 A | 3/1980 | Ootani et al. | |
| 4,195,110 A | 3/1980 | Dierks et al. | 428/218 |
| 4,203,788 A | 5/1980 | Clear | 156/44 |
| 4,206,267 A * | 6/1980 | Jungbluth | 428/623 |
| 4,242,406 A | 12/1980 | El Bouhnini et al. | 428/236 |
| 4,263,365 A | 4/1981 | Burgess et al. | 428/310 |
| 4,265,979 A | 5/1981 | Baehr et al. | 428/171 |
| 4,267,089 A | 5/1981 | Brown | |
| 4,277,526 A | 7/1981 | Jackson | |
| 4,287,241 A * | 9/1981 | Kaufmann | 427/403 |
| 4,288,959 A | 9/1981 | Murdock | 52/518 |
| 4,296,169 A | 10/1981 | Shannon | 428/298 |
| 4,303,722 A | 12/1981 | Pilgrim | 428/213 |
| 4,310,478 A | 1/1982 | Balslev et al. | |
| 4,324,082 A | 4/1982 | Rutkowski et al. | 52/481 |
| 4,335,177 A | 6/1982 | Takeuchi | 428/247 |
| 4,344,804 A | 8/1982 | Bijen et al. | 156/42 |
| 4,344,910 A | 8/1982 | Bijen | 264/257 |
| 4,351,867 A | 9/1982 | Mulvey et al. | 428/70 |
| 4,361,616 A | 11/1982 | Bomers | 428/215 |
| 4,363,666 A | 12/1982 | Johnson et al. | |
| 4,364,212 A | 12/1982 | Pearson et al. | 52/281 |
| 4,366,197 A | 12/1982 | Hanlon et al. | 428/43 |
| 4,378,405 A | 3/1983 | Pilgrim | 428/322.7 |
| 4,392,335 A * | 7/1983 | Heiman | 52/309.17 |
| 4,403,006 A | 9/1983 | Bruce et al. | 428/70 |
| 4,428,775 A | 1/1984 | Johnson et al. | |
| 4,437,274 A | 3/1984 | Slocum et al. | 52/105 |
| 4,468,909 A | 9/1984 | Eaton | 52/541 |
| 4,477,300 A | 10/1984 | Pilgrim | 156/44 |
| 4,504,533 A | 3/1985 | Altenhofer et al. | 428/70 |
| 4,506,060 A | 3/1985 | White, Sr. et al. | 525/163 |
| 4,543,159 A * | 9/1985 | Johnson et al. | 162/164.1 |
| 4,571,356 A | 2/1986 | White, Sr. et al. | 428/143 |
| 4,637,860 A | 1/1987 | Harper et al. | 162/117 |
| 4,647,496 A | 3/1987 | Lehnert et al. | 428/251 |
| 4,654,257 A * | 3/1987 | Murachi | 428/317.1 |
| 4,664,707 A | 5/1987 | Wilson et al. | 106/18.11 |
| 4,681,802 A | 7/1987 | Gaa et al. | 428/288 |
| 4,698,249 A * | 10/1987 | Brown | 428/44 |
| 4,722,866 A | 2/1988 | Wilson et al. | 428/411.1 |
| 4,774,794 A * | 10/1988 | Grieb | 52/309.7 |
| 4,810,569 A | 3/1989 | Lehnert et al. | 428/285 |
| 4,810,576 A | 3/1989 | Gaa et al. | 428/391 |
| 4,811,538 A | 3/1989 | Lehnert et al. | 52/455 |
| 4,902,347 A | 2/1990 | Soroushian et al. | |
| 4,923,034 A * | 5/1990 | Okuzawa et al. | 181/207 |
| 5,131,198 A * | 7/1992 | Ritchie et al. | 52/287.1 |
| 5,148,645 A | 9/1992 | Lehnert et al. | 52/443 |
| 5,220,762 A | 6/1993 | Lehnert et al. | 52/408 |
| 5,241,795 A | 9/1993 | Giroux et al. | |
| 5,319,900 A | 6/1994 | Lehnert et al. | 52/408 |
| 5,342,680 A | 8/1994 | Randall | 428/285 |
| 5,347,784 A * | 9/1994 | Crick et al. | 52/520 |
| 5,349,801 A * | 9/1994 | Verbofsky | 52/518 |

(56) References Cited

U.S. PATENT DOCUMENTS

| | | | |
|---|---|---|---|
| 5,371,989 A | 12/1994 | Lehnert et al. | 52/309.17 |
| 5,387,282 A | 2/1995 | Jakel | |
| 5,397,631 A | 3/1995 | Green et al. | 428/219 |
| 5,401,588 A | 3/1995 | Garvey et al. | 428/703 |
| 5,433,048 A | 7/1995 | Strasser | |
| 5,439,518 A | 8/1995 | Francis et al. | 106/705 |
| 5,501,056 A | 3/1996 | Hannah et al. | 52/748.1 |
| 5,580,409 A * | 12/1996 | Andersen | B01F 3/1214 |
| | | | 156/196 |
| 5,601,888 A | 2/1997 | Fowler | 428/34 |
| 5,614,307 A | 3/1997 | Andersen et al. | 428/294.7 |
| 5,625,986 A | 5/1997 | Mansfield et al. | |
| 5,641,584 A | 6/1997 | Andersen et al. | |
| 5,644,880 A | 7/1997 | Lehnert et al. | 52/408 |
| 5,661,937 A * | 9/1997 | Doppler et al. | 52/410 |
| 5,685,116 A | 11/1997 | Bradshaw et al. | |
| 5,694,728 A | 12/1997 | Heath, Jr. et al. | |
| 5,696,185 A | 12/1997 | Beckerle et al. | |
| 5,704,179 A | 1/1998 | Lehnert et al. | 52/408 |
| 5,718,785 A | 2/1998 | Randall | 156/39 |
| 5,772,846 A | 6/1998 | Jaffee | 162/145 |
| 5,791,109 A | 8/1998 | Lehnert et al. | |
| 5,799,446 A | 9/1998 | Tamlyn | |
| 5,830,548 A | 11/1998 | Andersen et al. | 428/36.4 |
| 5,836,123 A | 11/1998 | Gulino | |
| 5,881,502 A | 3/1999 | Tamlyn | |
| 5,897,108 A | 4/1999 | Gordon et al. | 269/50 |
| 5,906,364 A | 5/1999 | Thompson et al. | 269/22 |
| 5,945,182 A | 8/1999 | Fowler et al. | 428/34 |
| 5,960,598 A | 10/1999 | Tamlyn | |
| 5,981,406 A | 11/1999 | Randall | 442/71 |
| 5,985,061 A | 11/1999 | Doi et al. | |
| 5,993,303 A | 11/1999 | Fladgard et al. | 451/356 |
| 6,001,169 A | 12/1999 | Kawai | |
| 6,018,924 A | 2/2000 | Tamlyn | |
| 6,029,966 A | 2/2000 | Hertz et al. | 269/266 |
| 6,258,190 B1 | 7/2001 | Sciarrino et al. | |
| 6,276,107 B1 | 8/2001 | Waggoner et al. | 52/554 |
| 6,293,534 B1 | 9/2001 | Leban | 269/309 |
| 6,338,229 B1 | 1/2002 | Botzen | |
| 6,341,458 B1 | 1/2002 | Burt | 52/287.1 |
| 6,346,146 B1 | 2/2002 | Duselis et al. | |
| 6,354,049 B1 | 3/2002 | Bennett | 52/287.1 |
| 6,358,585 B1 | 3/2002 | Wolff | 428/36.6 |
| 6,367,222 B1 | 4/2002 | Timbrel et al. | 52/555 |
| 6,391,131 B1 | 5/2002 | Newman et al. | |
| 6,427,401 B2 * | 8/2002 | Bennett | 52/288.1 |
| 6,506,248 B1 | 1/2003 | Duselis et al. | |
| 6,510,667 B1 | 1/2003 | Cottier et al. | |
| 6,569,379 B2 * | 5/2003 | Bates et al. | 266/274 |
| 6,591,566 B1 | 7/2003 | Rodlin | |
| 6,625,950 B1 | 9/2003 | Shreiner et al. | |
| 6,660,359 B1 * | 12/2003 | Wirth | B32B 5/08 |
| | | | 428/108 |
| 6,684,597 B1 | 2/2004 | Butcher | |
| 6,699,576 B2 | 3/2004 | Peng et al. | |
| 6,705,052 B1 | 3/2004 | Larson | |
| 7,028,436 B2 | 4/2006 | Bezubic, Jr. | |
| 2001/0025078 A1 | 9/2001 | Mayer et al. | |
| 2002/0100249 A1 | 8/2002 | Peng et al. | |
| 2002/0155269 A1 * | 10/2002 | Holowczak et al. | 428/294.7 |
| 2002/0175126 A1 | 11/2002 | Naji et al. | |
| 2003/0121217 A1 * | 7/2003 | Grizenko | 52/60 |
| 2003/0126817 A1 * | 7/2003 | Gleeson et al. | 52/460 |
| 2003/0226327 A1 | 12/2003 | Perry | |

FOREIGN PATENT DOCUMENTS

| | | |
|---|---|---|
| CA | 993779 | 7/1976 |
| DE | 1 033 133 B1 | 6/1955 |
| DE | 1 509 853 B1 | 4/1963 |
| DE | 1 223 287 B1 | 8/1965 |
| DE | 28 08 723 A1 | 3/1979 |
| DK | 3679/80 | 8/1980 |
| EP | 0 148 760 A2 | 7/1985 |
| EP | 0 148 761 A2 | 7/1985 |
| EP | 0 263 763 A2 | 11/1987 |
| EP | WO9957392 A1 | 11/1999 |
| EP | 0973699 B1 | 6/2003 |
| EP | 0943040 B1 | 12/2003 |
| GB | 772 581 A | 4/1957 |
| GB | 1 204 541 A | 9/1970 |
| GB | 1 520 241 A | 9/1978 |
| GB | 2 004 807 A | 4/1979 |
| GB | 2 103 563 A | 2/1983 |
| JP | 2141484 A2 | 5/1990 |
| JP | 3208871 A2 | 9/1991 |
| JP | 03337538 | 11/1991 |
| JP | 04189937 | 6/1992 |
| JP | 04189938 | 6/1992 |
| JP | 5147997 A2 | 6/1993 |
| JP | 6001679 A2 | 1/1994 |
| JP | 6008219 A2 | 1/1994 |
| JP | 7187748 A2 | 7/1995 |
| JP | 2001-180997 | 7/2001 |
| WO | WO 98/16697 A1 | 4/1998 |
| WO | WO 98/45222 A1 | 10/1998 |
| WO | WO 00/21901 A1 | 4/2000 |
| WO | WO 00/61519 A1 | 10/2000 |
| WO | WO 01/16048 A1 | 3/2001 |
| WO | WO 01/42164 A1 | 6/2001 |
| WO | WO 02/25034 A1 | 9/2001 |
| WO | WO 02/31287 A1 | 4/2002 |
| WO | WO 02/070247 A1 | 9/2002 |
| WO | WO 02/070248 A1 | 9/2002 |
| WO | WO 02/070425 A1 | 9/2002 |
| WO | WO 2004/018090 A1 | 8/2003 |

OTHER PUBLICATIONS

F. Bakula, et al., The Study of Autoclaved Cellulose Fiber-Reinforced Cement Composites, Cement and Concrete Research, vol. 25, No. 1, pp. 71-78, 1995.
Wierman and Shah, "The Effects of Pressure on the Freeze-Thaw Durability of Fiber-Reinforded Cement Board", Moslemi, A., Ed., "Inorganic-Bonded Wood and Fiber Composite Materials", vol. 8, 14 pages, Sun Valley, Idaho, Sep. 2002.
Cedar Valley Handy Panels, Cedar Valley Shingle Systems, 1998, Trade Literature.
Cemtrim Premium Fiber-Cement Trim, Trade Literature.
Azek Trimboards, Vycom Corp. Trade Literature.
Royal Wood® Precision Composites, Inc. Trade Literature.
HardiTRIM HLD™ Technology Exterior Trim, James Harding Siding Products, 1999,Trade Literature.
Active Minerals Company LLC, Acti-Gel™ 208 Features & Benefits, Jan 15, 2002, Trade Literature.
James Hardie Siding Products, Fact Sheet James Hardie Building Products U.S. Siding Operations and Products, Apr. 25, 2002, Trade Literature.
What's New, James Harding Building Products Buys Cemplank Plants, Cemplank, Apr. 25, 2002, Trade Literature.
Multishake, MaxiTile, Apr. 25. 2002, Trade Literature.
MIRATEC™ Treated Exterior Composite TRIM, Trade Literature.
American Classics, Maibec, Trade Literature.
TruWood® Manufactured by Collins Products LLC Siding, Trade Literature.
Snapper Siding is Really Great Shakes, Pacific International Siding Co., Trade Literature.
Technical Bulletin 2004, Fancy Cuts Panel, Shakertown 1992, Inc., Trade Literature.
Cement Boards, NERAC, Inc., Jun. 20, 2002.
Owens Corning Exterior System, Sep. 10, 2000, Trade Literature.
Cedar Valley Shingle Siding Panels, Cedar Valley Shingle Systems, 1999, Trade Literature.
Rhoplex® E-330 Cement Mortar Modifier, Rohm and Haas Company, 1997, Trade Literature.
Weather Boards, Fibercement Siding, CertainTeed, Nov. 2001, Trade Literature.
BASF Corporation, Polymin® PR 971 L, trade literature, 2 pages, 1998-2003 http://www.basf.com/SearchProxy/search?q=cache:bnHftBjgwvkJ:www.basf.com/business.

(56) References Cited

OTHER PUBLICATIONS

BASF Corporation, Retention and Dewatering Aids, Flocculants, and Fixing Agents, trade literature, 2 pages, 1998-2003 http://www.basf.com/SearchProxy/search?q=cache:8b9Jx0pnefEJ:www.basf.com/business.

Praestol, Flocculants for effective separation of solids from liquids, trade literature, 1 page, Mar. 7, 2005 http://www.degussa-water.com/notesdata/bw/water.nsf/hauptpunkte_en/2D4179FD9D2C3C.

Degussa, Bleaching & Water Chemicals, Praestol® Flocculants for all Applications involving Solid/Liquid Separation (Clarification, Thickening, Dewatering), trade literature, pp. 1-17, undated.

Build-Smarter.com, Chapter Five: Roofing Materials, Fiber Cement Tiled, MaxiTile, trade literature, 2 pages, 1999 http://64.233.161.104/search?q=cache:4cbr8wfF3skJ:www.build-smarter.com/Chapter5/fibe.

DensGold™ Exterior Guard, G-P Gypsum trade literature, 2003, pp. 1-16.

CertainTeed WeatherBoards™ Fiber Cement Siding, trade literature, Nov. 2003, pp. 1-27.

Fernandez et al., "Cement-Bonded Boards from Wastewater Treatment Sludge of a Recycled Paper Mill," Wood-Cement Composites in the Asia-Pacific Region, pp. 73-80, Proceedings of a Workshop held in Canberra, Australia, Dec. 10, 2000.

Office Action in U.S. Appl. No. 10/288,189 dated Jul. 7, 2004.

Office Action in U.S. Appl. No. 10/288,189 dated Feb. 2, 2005.

Syton HD-50 Colloidal Silica Slurry; Trade Litreature; DA NanoMaterials LLC.

Nalco Colloidal Technologies: Colloidal Silica Binders; Trade Literature; Nalco Company.

Nyacol Silica Additives; Trade Literature; Nyacol Nanotechnologies Inc.

Grace LUDOX Colloidal Silica; Trade Literature; W.R. Grace.

M-5 CAB-O-SIL Thickening Agents for Fluids; Trade Literature; Eager Polymers.

SYLOID Silica C-Grades; Trade Literature; W.R. Grace.

Lo-Vel Flatting Agents; Trade Literature; PPG Silica Products.

Hi-Sil Thickening Agents; Trade Literature; PPG Silica Products.

May 16, 2008 Letter from John D. Haynes to Tony Fitzpatrick.

A. A. Moslemi; Emerging Technologies in Mineral-Bonded Wood and Fiber Composites; 1999; Advanced Performance Materials; vol. 6; pp. 161-179.

S. K. Saxena; Polyvinyl Alcohol (PVA); 2004; Chemical and Technical Assessment; 61st JECFA; p. 1.

* cited by examiner

CEMENTITIOUS EXTERIOR SHEATHING PRODUCT HAVING IMPROVED INTERLAMINAR BOND STRENGTH

CROSS REFERENCE TO RELATED APPLICATION

The present application is a Division of U.S. application Ser. No. 11/564,517, filed Nov. 29, 2006, which is a Division of U.S. application Ser. No. 10/342,529, filed Jan. 15, 2003 (D0932-00291), now U.S. Pat. No. 7,155,866, which is a continuation-in-part of U.S. application Ser. No. 10/288,189, filed Nov. 5, 2002, now U.S. Pat. No. 7,028,436 (D0932-00276).

FIELD OF THE INVENTION

This invention relates to exterior sheathing products which incorporate cementitious materials, and especially, fibercement sheathing having greater interlaminar bond strength.

BACKGROUND OF THE INVENTION

Fibercement has been used in the United States building materials industry since the 1980's. This material is used in residential and commercial construction applications as an alternative to wood for siding, roofing, backer board, trim and fascia applications. Fibercement is fire and insect resistant, and is more durable. In fact, it was the fastest growing market segment in the exterior sheathing industry in the 1990's, and by 2005, this material is expected to gain up to 25 percent of the siding market.

Fibercement is, technically, a composite of portland cement, aggregate (usually sand), and cellulose fibers. Cellulose fibers are added to cement to increase its toughness and crack-arresting ability. Fibercement shingle and shake products are widely available from such sources as James Hardie, Inc. under the brand name Hardiplank® and CertainTeed Corporation under the brand name Weatherboards™. These products are produced by the Hatchek de-watering process, which results in a laminated flat sheet reinforced with a significant amount of cellulose fibers, usually about 30-35 percent by volume.

Fibercement materials possess useful properties, but they were at one point in their history believed to be unsuitable for exterior use since they were susceptible to damage due to the effect of freeze-thaw cycles. See Harper et al., U.S. Pat. No. 4,637,860. Freeze-thaw action can cause severe deterioration to fibercement building products. The primary cause of damage is due to the hydraulic pressures that develop as water freezes and expands in tiny fissures and pores of cementitious materials. Once these forces exceed the strength of the material, cracking occurs. During subsequent thawing, the water then moves through the cracks, expanding them further, to cause more damage when freezing occurs again.

Harper et al., U.S. Pat. No. 4,637,860, suggested that better freeze-thaw resistance could be achieved by autoclaving a cellulose fibercement mixture with silica sand additions. These inventors also recognized that silica sand additions reduced the density of formed sheet materials to a level below that necessary to achieve sufficient strength and freeze-thaw resistance. Accordingly, the '860 patent suggested compressing the wet mixture in a press to reduce its thickness and increase its density prior to autoclaving. Such a process has been proven to be effective in increasing the interlaminar bond strength ("ILB strength") of fibercement boards when pressures approaching 30 bar are used. See Wierman et al., "The Effects of Pressure on Freeze-Thaw Durability of Fiber-Reinforced Cement Board" (September, 2002).

While improvements to the processing of fibercement sheathing have been introduced, there have been some notable disadvantages associated with fibercement products compared to vinyl siding products. Specifically, even with cellulose fiber reinforcement, fibercement exterior panels are susceptible to cracking by nails and screws, especially along their edges. Moreover, while high pressure pressing has improved ILB strength, fibercement trim boards are still susceptible to freeze-thaw delamination failures, and could be improved in this area.

Accordingly, there is a current need in the cementitious exterior sheathing industry for a more durable cementitious siding and trim panel.

SUMMARY OF THE INVENTION

This invention provides exterior building products which, in a first embodiment, include an exterior-facing side having an aesthetic appearance, a wall-facing side, and a cross-sectional thickness. The building product further comprises a plurality of layers containing a cementitious mixture, including cement, reinforcing fibers and aggregate. It further contains a resinous bond promoter disposed at least within an interlaminar region defined by two of said layers in said building product to increase the interlaminar bond strength of said building product.

The present invention represents a significant improvement in ILB strength for cementitious building products, such as siding, shakes, roofing shingles, soffiting, and the like. By introducing a resinous bond promoter, such as acrylic, starch, polyvinyl alcohol, or polyvinyl acetate, a rheological agent, or by the use of mechanical means, such as a pin roll, vibration table, or needling machine for piercing or agitating the assembled sheet and displacing the fibers generally perpendicular to the plane of the sheet, thus allowing the fibers to join the sheets together, improved strength between individual layers of cementitious material can be attained. Sufficient resinous additions, manipulation of the fiber, or both, can result in improvements to ILB strength of at least about 10%, preferably about 25%, and most preferably in excess of 40%, with improvements in the percent elongation (a measure of ductility) of at least about 5%, preferably about 7%, and most preferably greater than 15%.

Such improvements in ILB strength and ductility have the potential of increasing the durability of such building products, and may allow lighter density or thinner products to be commercialized. When resinous bond promoters are employed, a further unexpected benefit has been obtained by a significant reduction in water absorption, measured in treated test samples. This testing clearly demonstrates that samples incorporating acrylic-based bond promoters between fibercement layers actually assist the product in resisting water penetration throughout the product thickness, even at its exterior face. Since the preferred bond promoter, acrylic emulsion, is similar to the sealer coater often used for exterior fibercement products, the sealer step in the production of fibercement products can be eliminated, along with its attendant drying and curing steps, to reduce manufacturing costs. In addition to these cost savings, the reduction in water penetration throughout the product limits the amount of water which can contribute to the freeze-thaw effect, and this physical property, in combination with the increased ILB strength, should yield a substantial increase in freeze-thaw resistance.

In a further embodiment of this invention, an exterior siding or roofing product comprising an exterior facing side having an esthetic appearance and a wall-facing side is provided. The product includes a plurality of fibercement layers, and a resinous bond promoter disposed between at least the first pair of the layers in the plurality of layers to increase the inner laminar bond strength of the product.

In still a further embodiment of this invention, a method of manufacturing an exterior siding product is provided which includes the steps of: forming a slurry containing a cementitious mixture including cement, reinforcing fibers and aggregate; disposing said slurry onto a porous belt to form a wet, cementitious member having at least two layers therein; applying a resinous bond promoter to at least an interlaminar region defined by said two layers; dewatering said cementitious member; and curing said cementitious member, whereby said resinous bond promoter increases the interlaminar bond strength of said building product.

In still a further embodiment of this invention, an exterior cementitious building product is provided which includes an exterior-facing side having an esthetic appearance, a rearwardly facing side and a cross-sectional thickness containing a plurality of layers, said building product containing a cementitious mixture, including cement, reinforcing fibers, aggregate and a resinous bond promoter disposed in a sufficient quantity to increase the interlaminar bond strength of said building product while simultaneously improving its resistance to water absorption. This embodiment can be further improved by adding a pigment to the resinous bond promoter so that the product has a color or tint at its exterior surface, or throughout the product.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Cementitious "exterior building products," such as, for example, lap siding, roofing and siding shakes, sheathing, and shingles, panels, planks, vertical siding, soffit panels, fascia, corner posts, column corners, decking, fencing and trim boards, and methods for their manufacture, are provided by this invention. As used herein, "cementitious" refers to hydraulically settable materials, including a hydraulically settable binder, such as hydraulic cement, gypsum hemihydrate, and calcium oxide, and water to which components such as aggregate, fibers, and according to this invention, bond promoters, dispersants and a rheology-modifying agents can be selectively added to modify the properties of the mixture. The term "fibercement" refers to a cementitious composition including portland cement, cellulose fibers and sand. In preferred embodiments of this invention, ILB strength can be improved while simultaneously minimizing the degree of water penetration for exterior building products. This is a powerful combination for reducing freeze-thaw failures due to the melting and freezing of absorbed water, since fibercement products modified with a resinous bond promoter are stronger to begin with, and also resist water absorption, which means there will be less water in the pores of the material to freeze. The resinous bond promoters of this invention can be provided in latex or emulsion form in ratios of between 1:2 (50%) to about 1:20 (5%) of resin to water, and can include pigments to provide a stain, tint or color throughout, or partially through the product, UV stabilizers to help assist in UV resistance, and further additives which will be later described herein.

Figure 1:
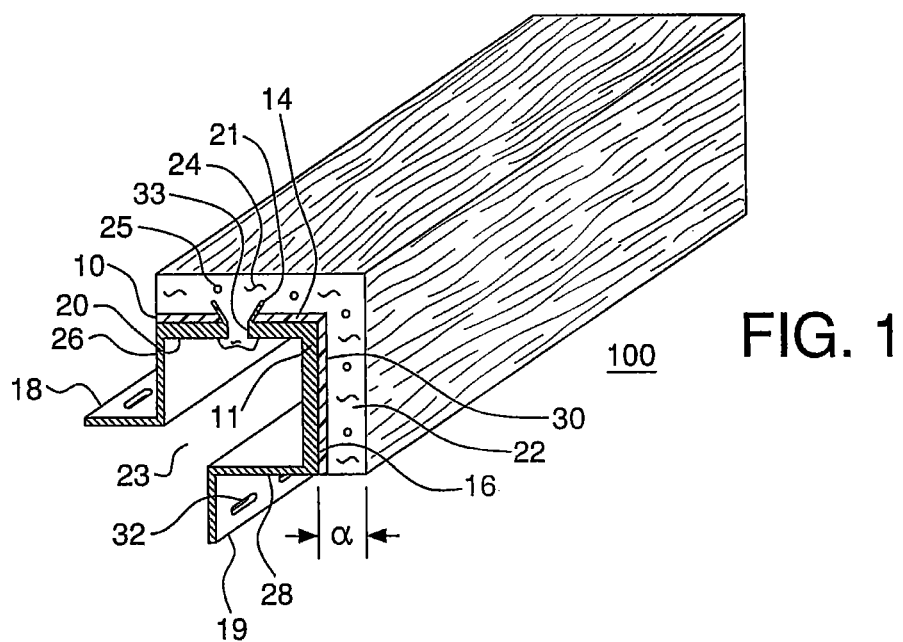
FIG. 1: is a front perspective view of an exterior building product of this invention.
Figure 2:
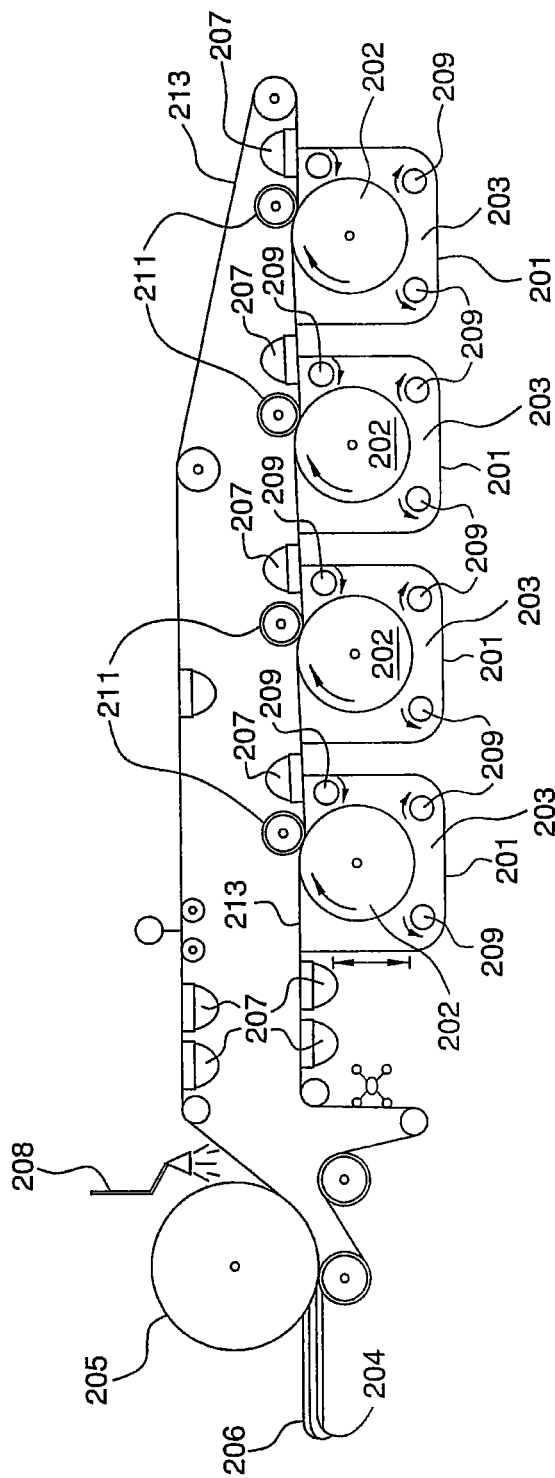
FIG. 2: is a diagrammatic, partial view of a manufacturing technique, including the step of de-watering of a plurality of cementitious layers.
Figure 3:
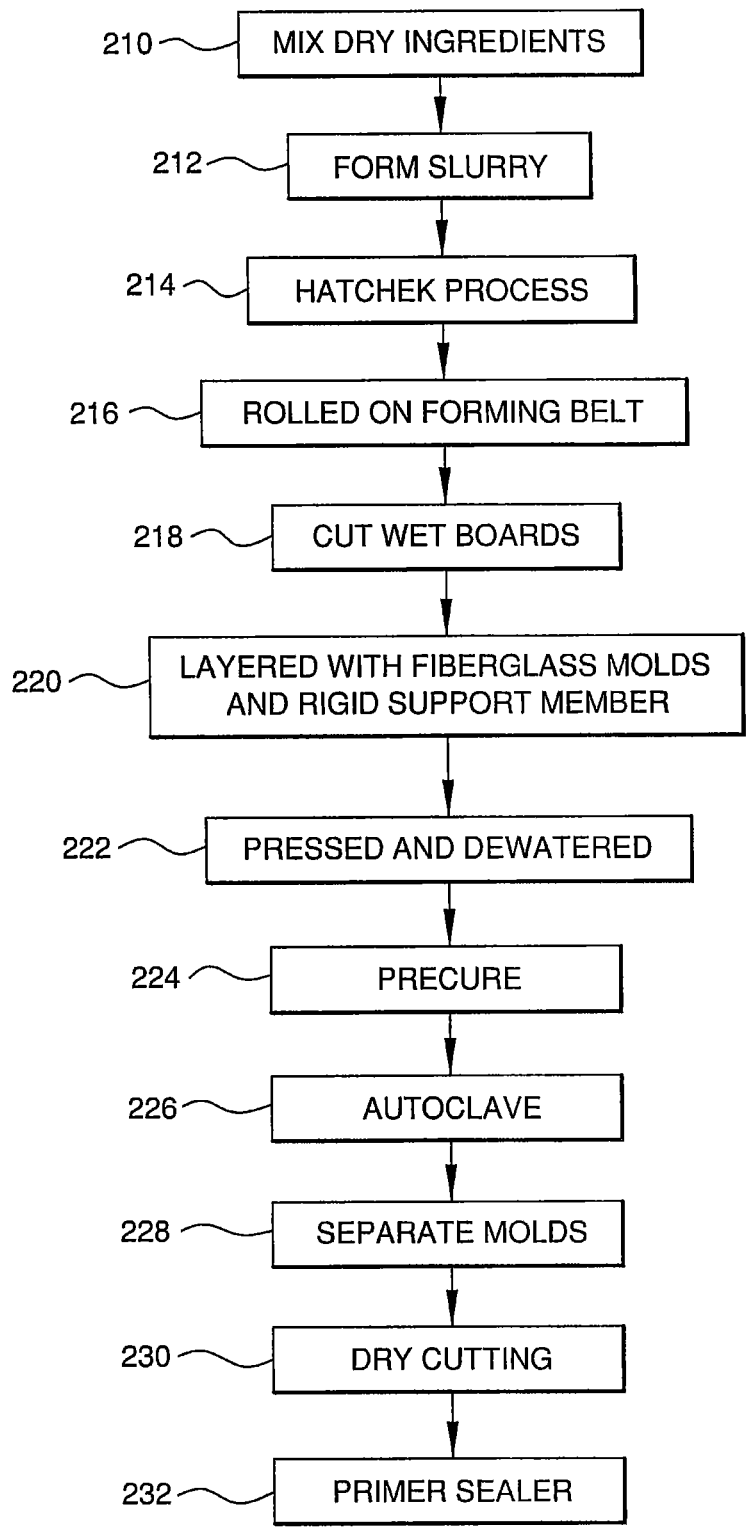
FIG. 3: is a flow diagram of a preferred Hatchek and pressing process for manufacturing the building products of this invention.

With reference to the figures, and particularly FIGS. 1-3 thereof, a process for making cementitious exterior building products, such as a shake 100, is disclosed. In a first embodiment of this invention, shown in FIG. 1, a shake 100, having a length, width and cross-sectional thickness "α" is provided. The shake 100 includes a wall-facing side 20 and an exterior-facing side 10, a pair of lateral side portions and a pair of longitudinal ends. The shake 100 further includes a cementitious composition 22, having multiple layers 204, described hereafter with reference to FIG. 2, typical of the Hatchek de-watering process, preferably made from fibercement, including fibers 24 and aggregate 25. The shake 100 exhibits an aesthetic appearance, such as a wood grain. The cementitious composition 22 can easily be formed into decorative panels, including lap and full cut designs with deep, authentic textures, grooves and contours, such as, for example, lap shingles, with random square straight edges, random square staggered edges, half rounds, and octagons.

The preferred shake 100 of this invention has increased ILB strength at conventional thicknesses enables the use of thinner cross-sections, or both, when compared to current commercial products. The shake 100 or other exterior building product of this invention can include a thickness "α" of at least about 0.05 inches, preferably about 0.25-1.00 inches, and more preferably about 0.31-0.75 inches.

With regard to the process for manufacturing shake, boards and sheathing products of this invention, reference is now made to FIGS. 2-7. The steps for manufacturing fibercement are well known. First, the dry ingredients are mixed thoroughly in a mixing step 210 of FIG. 3. These ingredients typically include, aggregates, fibers, dispersants, and a hydraulically settable binder, such as cement. A typical construction will include portland cement, sand, cellulose fibers, kaolin and performance additives in less than one percent by weight. These dry ingredients are next mixed with water and formed into a slurry at step 212. The slurry 203, shown in FIG. 2, is deposited by displacement screws to a series of tanks 201 which are fluidly connected to a series of transfer (or pick up) rolls 202. Agitators 209 disposed in the tanks 201 help to mix the fibercement slurry 203 to keep the ingredients from settling. The transfer rolls 202 and pressure rolls 211 apply a thin layer of slurry 203 to the felt belt 213. As this belt 213 passes by each tank 201 it "picks up" a little more slurry until the full wet thickness of each layer 204 is achieved.

The Hatchek process 214 includes a dewatering station or vacuum box 207 for de-watering each layer 204 of cementitious material and an accumulator roll 205 for assembling the layers together into about a 0.25-1.00 inch, preferably about 0.31-0.75 inch (dry cured thickness), multi-layered sheet 206. The cementitious sheet 206 is roll formed at step 216 through one or more further nip rolls or belts, followed by a cutting step 218. In a preferred embodiment, the multi-layered sheet 206 is wet or shear cut at step 218 to provide a 5 ft. wide×12 ft. long sheet dimension. The cutting step 218 can be accomplished by a water jet or cutting knife 306 as shown in FIG. 4.

Figure 4:
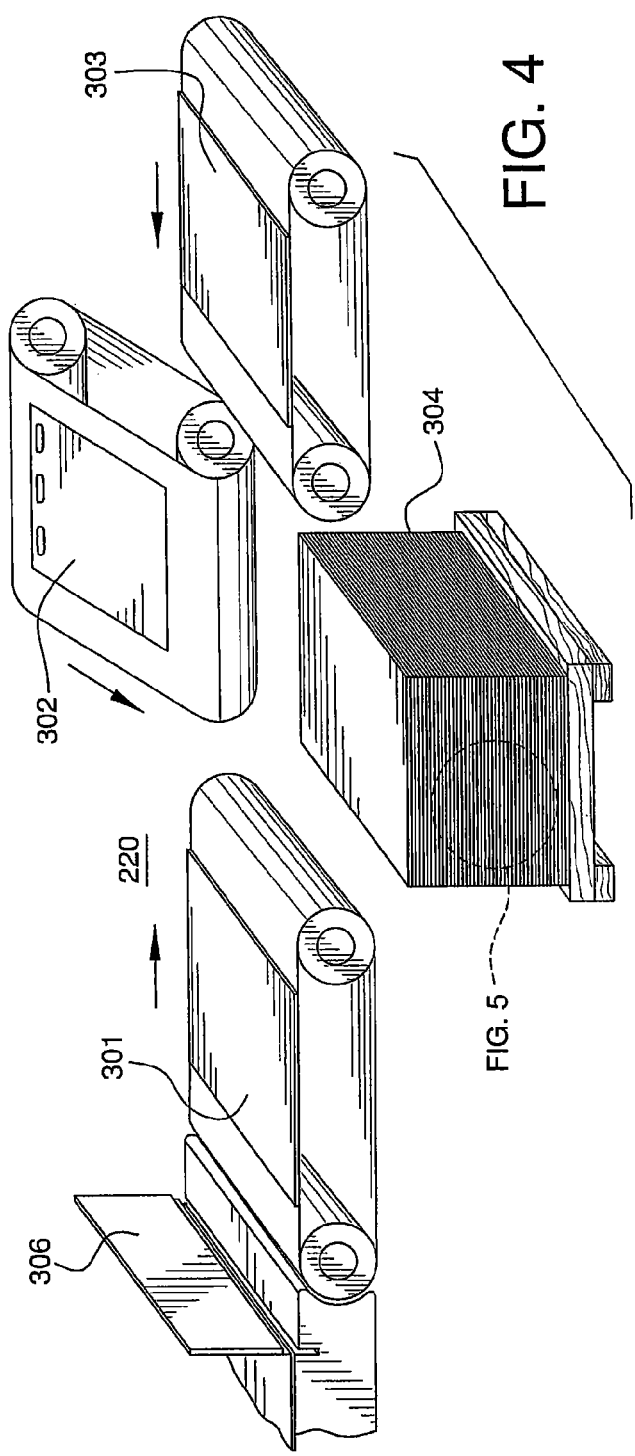
FIG. 4: is a diagrammatic front perspective view of the stacking of fiberglass molds and wet cement boards prior to pressing.
Figure 5:
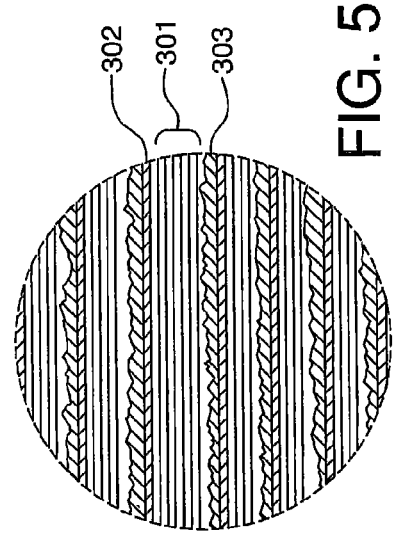
FIG. 5: is a partial cross-sectional side view of a portion of the stacked structure of FIG. 4, showing the alternate layers of fibercement and fiberglass molds.

At the layering step 220, which is diagrammatically illustrated in FIGS. 4 and 5, a plurality of fiberglass molds 303, containing, for example, an aesthetic wood grain or the like, are joined with the cut boards 301 in a stack 304.

Figure 6:
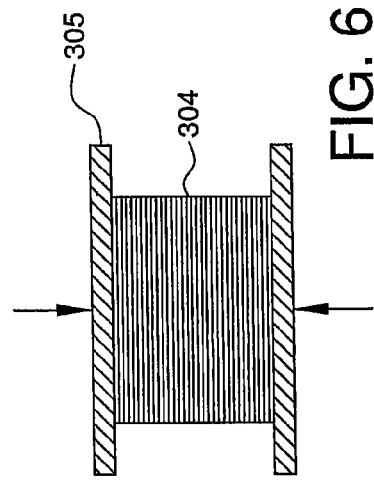
FIG. 6: is a diagrammatic side view of a pressing operation.

The pressing and final de-watering of the product is accomplished at step 222, shown also in FIG. 6, in which great pressures of about 100 psi-500 psi (30 bar) are applied by a 16,000 ton press and platens 305 for approximately one hour. The pressing and de-watering step 222 should be sufficient to squeeze water out of the cementitious material and impress an ornamental appearance from the fiberglass mold 303 onto the cut board 301.

The disclosed Hatchek process 214, can be modified to introduce an interlaminar bond strength promoter step 213, such as by introducing the promoter in the mixing step 210, slurry forming step 212, or through a spray head attachment 208, which can be located anywhere along the felt belt 213, and is preferably located proximate to the accumulator roll 205. Such an ILB strength promoter could include, for example, a cement mortar modifier or adhesive, such as acrylic, starch, polyvinyl alcohol, polyvinyl acetate, etc. The bond promoter is desirably provided in a latex or emulsion, such as the acrylic-based cement mortar modifier Rhoplex® E-330, available from Rohm & Haas Company, Philadelphia, Pa. The bond promoter is designed for assisting in promoting better adhesion between the layers 204 of the multilayered sheet 206, such as the layers 204 of shake 100, for example. Alternatively, or additionally, a rheological agent, such as "nano-sized" magnesium alumino silicate, can be sprayed onto the fibercement layer prior to sheet formation at the accumulation roll 205, to encourage flow between the individual cementitious layers 204 to create better interlaminar bond strength. One rheology-modifying agent used to produce such an effect is the Acti-gel™ brand of activated magnesium alumino silicate available from Active Minerals Company LLC, Hunt Valley, Md. Such rheological agents, like the cement modifiers and adhesives discussed above, can also be added to the slurry 203 in the tank 201, or during initial mixing of the slurry 203 ingredients, or through a combination of these techniques. The bond promoter or rheological agent is desirably applied to at least 50% of the surface area of the targeted surface, and more preferably, about 95% of this surface area, or greater. In addition, pigments such as dyes, carbon black or tinting agents could be added to impart shades or color at the surface of the product or throughout the product thickness.

In addition to resinous bond promoters and rheological agents, this invention proposes the use of mechanical manipulation of the wood fiber so that the individual fibers can be oriented in a "z" direction between layers to improve ILB strength. Presently, the fibers of most fibercement products are oriented in the machine direction and are relatively parallel to one another. In addition to using the suggested additives, or apart therefrom, one can use of a series of pins, partially or fully disposed within the layer or layers 204 to pierce the sheet and displace the fibers perpendicular to the machine direction, thus allowing the fibers to join the sheets together. The equipment for this technique can be inserted online and is not assumed to add significant cost to the raw materials. The technique may further, or alternatively, include a piercing wheel, punching die, vibration table, needling equipment, or a smoother surface such as a roll or plate which can be used to upset the fiber location on each, or selective ones, of the layers 101. Alternatively, a device can be configured with barbs to move the fibers as the tool inserts and extracts.

The effect of this mechanical manipulation operation will increase the ILB strength or allow a lighter weight product to be created having the strength of a thicker product made by conventional means. It is also likely to improve mechanical properties such as the flexural modulus of the product, since sheer between the sheets will be improved because of the bridging created by the fibers. Subsequent pressing can close up any voids that occur because of the mechanical manipulation.

Following the pressing and de-watering step 222, the stack 304 of formed boards, fiberglass molds 303 and support members 302 are pre-cured at step 224 in an oven for 12 hours at 140° F. and about 100% humidity. The precuring step 224 provides the now formed cementitious boards with sufficient mechanical properties to be transferred. At this stage, the cementitious product is about 15-20% cured. It is then subjected to a final autoclaving step 226 for 12 hours at about 325° F. in a saturated steam environment. The autoclaving step 226 should be sufficient to substantially cure the cementitious product to about a 99.9% cure. Following the autoclaving step 226, the board is separated from the molds at step 228, and then sent to inventory for a week or two prior to the dry cutting step 230. Dry cutting is typically accomplished with a gang saw including about 10 blades which are capable of cutting multiple products or making multiple cuts in a single product. In this fashion, grooves between boards, scallops, staggered edges and individual shapes can be cut into the cementitious material to provide an aesthetic appearance. Wet cutting with water jet is also suitable for this purpose.

Following the dry cutting step 230, the building product is sealed and primed at step 232. A good PVA or acrylic latex primer coat followed by a tinted finish coat helps to provide the shake 100 with years of weatherability. If a water-resistant bond promoter is used, such as Rhoplex® E-330, in sufficient quantity to be present on the surface of the shake 100, the seal and primer step 232 can be eliminated.

While the steps enumerated in the flow diagram of FIG. 3 have been successful in producing the exterior building products, such as shake 100 of this invention, it will be realized that these steps can be modified or changed from their selected sequence while still providing a quality product. For example, cutting could occur in the wet or green state, as opposed to a final cured state of the product to provide trim details such as circles, cuts between shapes and product edges. The pressing step 222 could be eliminated in favor of mold or belt curing or the like. The autoclave and separate mold steps 226 and 228 could be reversed for example, and as an alternative to the Hatchek process, molding processes could be employed, and an extruder could be used instead of an accumulation roll.

Materials Discussion

The following preferred materials have been selected for manufacturing the cementitious products of this invention.

Aggregates 25, fibers 24, dispersants, and a rheology-modifying agents can be selectively added to modify the properties of the cementitious composition 22. The cementitious composition 22 most preferably includes a known fibercement composition including wood fiber, silica sand and portland cement, with or without an acrylic modifier. A variety of additives can be included within the cementitious composition 22, such as organic binders, dispersants, one or more aggregate 25, fibers 24, air entraining agents, blowing agents, or reactive metals. The identity and quantity of any additive will depend on the desired properties or performance criteria of both the cementitious composition 22 as well as the sheathing or trim product made therefrom.

Organic binders are simply polymers that when added to water under certain conditions form long chains that intertwine and capture the components of the mixture. As water is removed from the mixture, these long chains solidify and bind the structural matrix. Because of the nature of these organic binders, however, they also function to modify the rheology of a composition. Whether the organic material is a binder, or primarily affects the rheology is a matter of degree and is dependent on the concentration. In smaller amounts the organic material primarily affects the rheology. As the amount of organic material is increased, its ability to bind the particles together increases, although it also continues to affect the rheology.

Organic binders can also be added to increase the cohesive strength, "plastic-like" behavior, and the ability of the mixture to retain its shape when molded or extruded. They act as thickeners and increase the yield stress of the inorganically filled mixture, which is the amount of force necessary to deform the mixture. This creates high "green strength" in the molded or extruded product. Suitable organic binders include a variety of cellulose-, starch-, and protein-based materials (which are generally highly polar), all of which assist in bridging the individual particles together.

Dispersants, on the other hand, act to decrease the viscosity and the yield stress of the mixture by dispersing the individual aggregates 25, fibers 24, and binding particles. This allows for the use of less water while maintaining adequate levels of workability. Suitable dispersants include any material which can be absorbed onto the surface of the binder particles or aggregates and which act to disperse the particles, usually by creating a charged area on the particle surface or in the near colloid double layer. The binders and dispersants can be introduced in the dry mixing step 210, slurry forming step 212 and/or sprayed between layers 204 by a spray head 208 onto the accumulator roll 202, for example.

It may be preferable to include one or more aggregate materials within the cementitious layer 22 in order to add bulk and decrease the cost of the mixture. Aggregates often impart significant strength properties and improve workability. An example of one such aggregate is ordinary silica sand or clay, which are completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight rocklike materials. These aggregates are likewise environmentally neutral and relatively inexpensive.

Fibers may be added to the cementitious layer 22 in order to increase the interlaminar bond strength, compressive, tensile, flexural, and cohesive strengths of the wet material as well as the hardened articles made therefrom. Fiber should preferably have high tear and burst strengths (i.e., high tensile strength), examples of which include waste paper pulp, abaca, southern pine, hardwood, flax, bagasse (sugar cane fiber), cotton, and hemp. Fibers with a high aspect ratio of about 10 or greater work best in imparting strength and toughness to the moldable material.

WORKING EXAMPLE I

Specimens for water absorption and mechanical testing were prepared by a Hatchek process diagrammatically provided in FIGS. 2 and 3 using the following formulation:
Ingredients
cellulose fiber 8 wt. %
cement (Portland type I-II) 36 wt. %
silica sand (greater than 97% quartz) 52 wt. %
clay (56% $SiO_2$, 28% alumina) 4 wt. %
mixed polymer concentration (Rhoplex® E330 latex) 0.6 wt %

These ingredients were added with water (77% by weight of water and the above ingredients). The Rhoplex® E-330 latex water emulsion, which is hydrophilic, can be applied (as will be described below) in an amount of about 0.1-5.0 wt %, more preferably, 0.2-0.8 wt %, based on the weight of the starting ingredients. A small amount of defoamer was also employed using a flow rate of about 2.2 g/hour.

The Rhoplex acrylic emulsion was applied using a plurality of spray nozzles. A spray rate of 1.5 g/m per nozzle at 40 psi was used. Each nozzle had a 80 degree spray zone intended to cover 10.1 inches if the orifice was 12 inches from the felt. Approximately 6 nozzles were used to cover the entire sheet (1.5 g/m/nozzle×6 nozzles=approximately 9 g/m rate). The orifice size of the nozzle was approximately 0.094 inches and the spray pattern was approximately flat.

In a first experiment, ILB strength measurements were employed using the ASTM C 1185 99 test method on 6 test and 6 control samples. Portions of these boards were also hydrostatically tested for water absorption against a base line. The break stress test results are included below in Table 1, and the water absorption test results are graphically depicted in FIG. 7.

TABLE 1

Break Stress Results
Test Method:

| Sample I.D. Control | Break Stress (MPa) | Test | Break Stress (MPa) | Ratio (test/control) |
|---|---|---|---|---|
| 0901 6C1 | 2.68 | 0901 6T1 | 2.52 | 0.94030 |
| 0901 6C2 | 2.01 | 0901 6T2 | 3.08* | 1.53234 |
| 0901 6C3 | 2.86 | 0901 6T3 | 3.08* | 1.07692 |
| 0901 7C1 | 3.08* | 0901 7T1 | 3.08* | 1 |
| 0901 7C2 | 2.66 | 0901 7T2 | 2.55 | 0.95865 |
| 0901 7C3 | 2.53 | 0901 7T3 | 3.08* | 1.21739 |
| Ave. | 2.63 | | 2.89 | 1.12093 |
| st. dev. | 0.36137 | | 0.28160 | |

*exceeded maximum range of machine

To summarize, the ILB strength for the test samples in Table 1 showed a 12% increase in strength with a 29% reduction in standard deviation. Four of the test samples and one of the control samples exceeded the limits of the machine limits, so the full extent of the improvement in ILB strength was not measurable for all samples. Additional portions of these boards were tested for M.O.R. and percent elongation and the test samples achieved a 2.8% drop in peak stress and a 7% increase in percent elongation, although the standard deviation was large.

Figure 7:
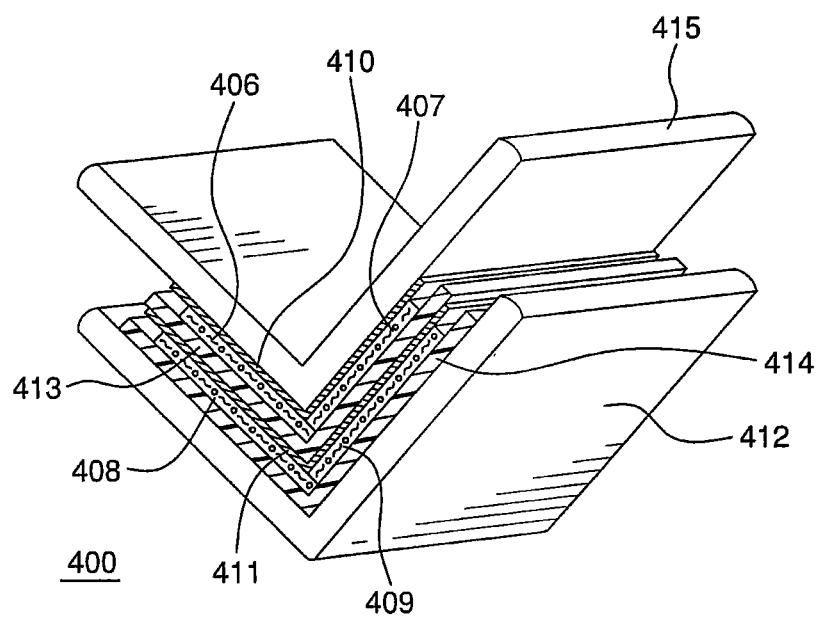
FIG. 7: is a diagrammatic side perspective view of a pressing operation for a corner trim board.

The water absorption test indicated that the test sample stabilized very quickly at about 2 hours and had a moisture increase from a baseline of only about 1, compared to the control which absorbed almost 5.6 times more water over 7 hours, as shown in FIG. 7.

WORKING EXAMPLE II

The same Hatchek process used for Working Example I was employed again to make a series of boards to develop the optimum loading ratio of Rhoplex E-330 to water. Using the same spray parameters, a pink trial (ratio of 1 part E-330:0 part water), gray trial (1:2), green trial (1:10), and blue trial (1:20), were performed. Attached below are the strength vs. concentration ratio measurements for the control and test samples which were cut from the same board in each ratio grouping.

TABLE 2

Strength vs. Concentration Ratio 1E-330: 0 Water

| Sample | 09837 Pink Trial | 09837 Pink Control | % Increase |
|---|---|---|---|
| Test 1 | 1.06 | 0.59 | |
| Test 2 | 0.61 | 0.89 | |
| Average | 0.84 | 0.74 | 12.84%* |
| Std. Dev. | 0.32 | 0.21 | |

1E-330: 2 Water

| Sample | 09837 Green Trial | 09837 Green Control | % Increase |
|---|---|---|---|
| Test 1 | 0.84 | 0.45 | |
| Test 2 | 0.65 | 0.57 | |
| Average | 0.75 | 0.51 | 46.08% |
| Std. Dev. | 0.13 | 0.08 | |

1E-330: 10 Water

| Sample | 09837 Blue Trial | 09837 Blue Control | % Increase |
|---|---|---|---|
| Test 1 | 0.51 | 0.38 | |
| Test 2 | 0.28 | 0.51 | |
| Average | 0.40 | 0.45 | −11.24%* |
| Std. Dev. | 0.16 | 0.09 | |

1E-330: 20 Water

| Sample | 09837 Gray Trial | 09837 Gray Control | % Increase |
|---|---|---|---|
| Test 1 | 0.64 | 0.60 | |
| Test 2 | 0.76 | 0.51 | |
| Average | 0.70 | 0.56 | 26.13% |
| Std. Dev. | 0.08 | 0.06 | |

*not statistically significant

The results appeared to support a finding that diluted compositions including E-330 and water were more readily distinguishable from pure E-330, and that ILB strength increases of 12.84% (pink) up to 46.08% (green) were possible using the resinous bond promoter techniques of this invention. The grey trial netted an increase of 26.13%, and it appears that the pink and blue trials were within the standard deviation and not statistically significant.

Finally, it is noted that the chemistry for the Rhoplex E-330 emulsion was based on an acrylic emulsion which is chemically similar to the sealer coat often used for fibercement sheathing products. Rhoplex E-330 does not yellow and has good UV resistance. During the above tests, it appeared that the Rhoplex E-330 emulsion left a coating on the embossed face of the product. The loading of a pigment or tint into the Rhoplex® system could presumably give the same type of finished appearance as the exterior sealer often used in commercial fibercement products. It was concluded that the use of a modified Rhoplex composition in lieu of a sealer coater could be used to free up equipment, reduce cycle time, reduce delamination of the present sealer layer, reduce costs relative to using both systems and increase performance.

From the foregoing, it can be realized that this invention provides cementitious building products which are stronger and more resistant to cracking than currently available commercial fibercement products. The preferred siding and roofing shakes and siding of this invention can have a much higher break stress and absorb less water, which should enable them to resist freeze-thaw damage to a greater degree than prior fibercement products. The cementitious layers of this invention can be joined to each other with adhesive bonds, cement modifiers or adhesives, or be reinforced with rheological modifying agents to increase ILB strength. Although various embodiments have been illustrated, this is for the purpose of describing, and not limiting the invention. Various modifications, which will become apparent to one skilled in the art, are within the scope of this invention described in the attached claims.

With reference to the figures, and particularly FIGS. 1-3 thereof, a process for making cementitious exterior sheathing products, such as a corner trim board 100, is disclosed. In a first embodiment of this invention, shown in FIG. 1, a corner trim board 100, is provided. The corner trim board 100 includes an elongated rigid support member 11 having a wall-facing side 20 and an exterior-facing side 10, a pair of lateral side portions and a pair of longitudinal ends. The exterior-facing side 10 includes at least a first and a second exterior wall portion 14 and 16, respectively. The corner trim board 100 further includes a first nailing flange 18 disposed along at least a first of the pair of lateral side portions, and a cementitious layer 22, preferably made from fiber cement, disposed at least on a portion of the exterior-facing side 10 of the rigid support member 11. The cementitious layer 22 exhibits an aesthetic appearance, such as a wood grain. The cementitious layer 22 can also take the shape of decorative panels, including lap and full cut designs with deep, authentic textures, such as lap shingles, random square straight edges, random square staggered edges, half rounds, and octagons.

The corner trim board 100 can further include a second nailing flange 19, the first and second nailing flanges 18 and 19 having disposed therethrough a plurality of fastener receiving holes 32. The fastener receiving holes 32 are desirably elongated slots through the rigid support member 11, although with some sacrifices, fastener holes can also, or alternatively, be located through the cementitious layer 22. The corner trim board 100 further includes, in this embodiment, third and fourth exterior wall portions 26 and 28 connected to the first and second exterior wall portions 14 and 16 respectively. The first, second, third and fourth exterior wall portions 14, 16, 26 and 28 are desirably arranged such that the first and fourth wall portions 14 and 28 are substantially parallel and the second and third wall portions 16 and 26 are substantially parallel. More preferably, the first nailing flange 18 is also substantially parallel to the first wall portion 14 and a second nailing flange 19 is substantially parallel to the second exterior wall portion 16, in this embodiment.

Alternatively, the rigid support member can take the form of a rectangular enclosure having first and second pairs of generally parallel walls (14, 28 and 16, 26 respectively), and a longitudinal slotted opening 23.

The cementitious layer 22 is disposed at least over the exterior-facing side 10 of the rigid support member 11, preferably prior to pressing and autoclaving. A good mechanical bond can be provided between the rigid support member 11 and the cementitious layer 22 by perforating the rigid support layer with through-holes 33 which allow the wet cementitious material to bulge through the rigid support member 11, as shown in FIG. 1, and following setting, provide it with a mechanically locking engagement. A plurality of like through-holes can be uniformly distributed through the first and second exterior wall portions 14 and 16, for example. Alternatively, or additionally, a resinous cementitious bond promoter 30 can be applied to any surface of the rigid support member II intended to be in contact with the cementitious layer 22, such as the first and second exterior wall portions 14 and 16, to promote an adhesive bond with the cementitious layer 22. Cementitious bond promoters include PVA and acrylic formulations, such as the acrylic-based cement mortar modifier Rhoplex® E-330, available from Rohm & Haas Company, Philadelphia, Pa. Additionally, the through-holes 33 can be punched through metal sheet or plate so as to provide one or more extending prongs 21 which can further aid in the mechanical locking of the cementitious layer 22 to the rigid support member 11 by extending into the cementitious layer 22 prior to curing.

The preferred corner trim board 100 of this invention enables the use of thinner cementitious materials than those formerly suggested for corner trim applications. The corner trim board 100 of this invention can include, for example, an cementitious layer 22 which is approximately at least about 0.05 inches, preferably about 0.25-0.75 inches, and more preferably about 0.31-0.63 inches in thickness, as opposed to as much as one inch thick prior art constructions. Additionally, since the fastener receiving holes 32 are preferably located in the rigid support member 11, nailing can be accomplished without risking the development of cracks or over-stressed areas in the cementitious layer 22. The corner trim board 100 of this invention can be designed to save at least 10 percent of the weight, and as much as 50 percent of the weight, of conventional trim board constructions without sacrificing strength or durability. In fact, due to the mechanical and/or adhesive bonding between the rigid support member 11 and cementitious layer 22, and the potential for "re-bar"-like reinforcement of the cementitious layer 22, the present construction may be even stronger.

At the layering step 220, which is diagrammatically illustrated in FIGS. 4 and 5, the rigid support member 302 and suitable fiberglass mold 303, containing, for example, an aesthetic wood grain or the like, are joined with the cut board 301 in a stack 304.

The pressing and final de-watering of the product is accomplished at step 222, shown also in FIG. 6, in which great pressures of about 500 psi (30 bar) are applied by a 16,000 ton press for approximately one hour. The pressing and de-watering step 222 should be sufficient to squeeze water out of the cementitious material and impress an ornamental appearance from the fiberglass mold 303 into the cut board 301.

The disclosed Hatchek process 214, can be modified to introduce an interlaminar bond strength ("ILB") promoter through spray head 208. Such an ILB strength promoter could include, for example, a cement mortar modifier or adhesive, such as acrylic, or PVA, such as the aforementioned Rhoplex® E-330, for assisting in promoting better adhesion between the layers 204 of the multilayered sheet 206. Alternatively, or additionally, a rheological agent, such as "nano-sized" magnesium alumino silicate, can be sprayed onto the fiber cement layer prior to sheet formation at the accumulation roll 205, to encourage flow between the individual cementitious layers 204 to create better interlaminar bond strength. One rheology-modifying agent used to produce such an effect is the Acti-gel™ brand of activated magnesium alumino silicate available from Active Minerals Company LLC, Hunt Valley, Md. Such rheological agents and cement adhesive promoters can also be added to the slurry 203 in the tank 201, or during initial mixing of the slurry 203 ingredients, or through a combination of these techniques.

In connection with the corner trim board 100 of this invention, an alternate press operation 400 is shown in FIG. 7. In this operation 400, a plurality of 4 inch wide by foot long strips of fiber cement board, such as the first set of fiber cement board strips 406, 407 and second set of fiber cement board strips 408 and 409, are transferred into a stack and layered between the first and second V-shaped fiberglass molds 412, 413 and first and second V-shaped rigid support members 410, 411. The stack is introduced between a pair of V-shaped steel platens, 414, 415 and the press is activated to combine the board strips together into a bonded corner having a imprinted aesthetic surface thereon. This process may be used to make one, or a plurality of corner trim boards 100 of this invention. Following the pressing operation 400, the nailing flanges 18 and 19 can be formed in a break or the like.

Following the pressing and de-watering step 222, the stack 304 of formed boards, fiberglass molds 303 and support members 302 are pre-cured at step 224 in an oven for 12 hours at 140° F. and 100% humidity. The pre-curing step 224 provides the now formed cementitious boards with sufficient mechanical properties to be transferred. At this stage the cementitious product is about 15-20% cured. It is then subjected to a final autoclaving step 226 for 12 hours at 325° F. in a saturated steam environment. The autoclaving step 226 should be sufficient to substantially cure the cementitious product to about a 99.9% cure. Following the autoclaving step 226, the board is separated from the molds at step 228, and then sent to inventory for a week or two prior to the dry cutting step 230. Dry cutting is typically accomplished with a gang saw including about 10 blades which are capable of cutting multiple products or making multiple cuts in a single product. In this fashion, scallops, staggered edges and individual shapes can be cut into the cementitious material to provide an aesthetic appearance. Wet cutting with water jet is also suitable for this purpose.

Following the dry cutting step 230, the cementitious product is sealed and primed at step 232. A good PVA or acrylic latex primer coat followed by a tinted finish coat helps to provide the corner trim board 100 with years of weatherability.

While the steps enumerated in the flow diagram of FIG. 3 have been successful in producing the cementitious products and corner trim boards 100 of this invention, it will be realized that these steps can be modified or changed from their selected sequence while still providing a quality product. For example, cutting could occur in the wet or green state, as opposed to a final cured state of the product to provide trim details such as circles, cuts between shapes and product edges. The pressing step 222 could be eliminated in favor of mold or belt curing or the like. The autoclave and separate mold steps 226 and 228 could be reversed for example, and as an alternative to the Hatchek process, molding processes could be employed, and an extruder could be used instead of an accumulation roll.

Materials Discussion

The following preferred materials have been selected for manufacturing the cementitious products of this invention.

In the preferred embodiment, the rigid support member 11 includes a rigid polymer resin, such as, rigid polyvinyl chloride ("pvc"), fiberglass-reinforced epoxy or polyester, or a metal plate, sheet or lath. Suitable metallic materials include anodized or polymer-coated aluminum or copper, brass, bronze, stainless steel, or galvanized steel, in plate, sheet or lath form. If aluminum is selected, it should be coated wherever it comes in contact with the cementitious material of this invention, since it is prone to attack by alkali compositions. Similarly, carbon steel selections should be coated or galvanized in order to prevent rusting, especially in the first and second nailing flanges 18 and 19. The metal plate or lath can be roll formed and punched in order to provide through-holes 33 and fastener receiving holes 32. If a lath, scrim, or mesh construction is used, separate holes may not be necessary since the open construction of a lath, scrim, or mesh is ideal for mechanically locking with the cementitious layer 22 and is easily penetrated by fasteners such as nails and screws. With lath or scrim constructions, embedding within the cementitious layer 22 is an option, in which case, the rigid support member may contain corrugations, grooves perforations or ridges to assist in mechanically locking with the cementitious layer 22.

Aggregates 25, fibers 24, dispersants, and a rheology-modifying agents can be selectively added to modify the properties of the cementitious layer 22. The cementitious layer 22 most preferably includes a known fiber cement composition including wood fiber, silica sand and portland cement, with or without an acrylic modifier. A variety of additives can be included within the cementitious layer 22, such as organic binders, dispersants, one or more aggregate materials 25, fibers 24, air entraining agents, blowing agents, or reactive metals. The identity and quantity of any additive will depend on the desired properties or performance criteria of both the cementitious layer 22 as well as the sheathing or trim product made therefrom.

Organic binders are simply polymers that when added to water under certain conditions form long chains that intertwine and capture the components of the mixture. As water is removed from the mixture, these long chains solidify and bind the structural matrix. Because of the nature of these organic binders, however, they also function to modify the rheology of a composition. Whether the organic material is a binder, or primarily affects the rheology is a matter of degree and is dependent on the concentration. In smaller amounts the organic material primarily affects the rheology. As the amount of organic material is increased, its ability to bind the particles together increases, although it also continues to affect the rheology.

Organic binders can also be added to increase the cohesive strength, "plastic-like" behavior, and the ability of the mixture to retain its shape when molded or extruded. They act as thickeners and increase the yield stress of the inorganically filled mixture, which is the amount of force necessary to deform the mixture. This creates high "green strength" in the molded or extruded product. Suitable organic binders include a variety of cellulose-, starch-, and protein-based materials (which are generally highly polar), all of which assist in bridging the individual particles together Dispersants, on the other hand, act to decrease the viscosity and the yield stress of the mixture by dispersing the individual aggregates 25, fibers 24, and binding particles. This allows for the use of less water while maintaining adequate levels of workability. Suitable dispersants include any material which can be absorbed onto the surface of the binder particles or aggregates and which act to disperse the particles, usually by creating a charged area on the particle surface or in the near colloid double layer. The binders and dispersants can be introduced in the dry mixing step 210, slurry forming step 212 and/or sprayed between layers 204 by a spray head 208 onto the accumulator roll 202, for example.

It may be preferable to include one or more aggregate materials within the cementitious layer 22 in order to add bulk and decrease the cost of the mixture. Aggregates often impart significant strength properties and improve workability. An example of one such aggregate is ordinary silica sand or clay, which are completely environmentally safe, extremely inexpensive, and essentially inexhaustible.

In other cases, lightweight aggregates can be added to yield a lighter, and often more insulating, final product. Examples of lightweight aggregates are perlite, vermiculite, hollow glass spheres, aerogel, xerogel, pumice, and other lightweight rocklike materials. These aggregates are likewise environmentally neutral and relatively inexpensive.

Fibers may be added to the cementitious layer 22 in order to increase the interlaminar bond strength, compressive, tensile, flexural, and cohesive strengths of the wet material as well as the hardened articles made therefrom. Fiber should preferably have high tear and burst strengths (i.e., high tensile strength), examples of which include waste paper pulp, abaca, southern pine, hardwood, flax, bagasse (sugar cane fiber), cotton, and hemp. Fibers with a high aspect ratio of about 10 or greater work best in imparting strength and toughness to the moldable material.

From the foregoing, it can be realized that this invention provides reinforced cementitious sheathing products which are lighter in weight and more resistant to cracking than currently available commercial fiber cement products. The preferred corner trim board of this invention can use less than half of the cementitious material of a conventional trim board, but since it is reinforced with a rigid support member, it will be easier to work with and provide potentially greater durability. The cementitious layers of this invention can be joined to the rigid support member with mechanical and/or adhesive bonds, and the individual layers of the cementitious products of this invention can be further reinforced with rheological modifying agents to increase ILB strength by allowing fibers to displace and flow better across the laminated boundaries of the cementitious materials, or by adding mortar or cement bonding agents for adhesively bonding these layers together, or both. Although various embodiments have been illustrated, this is for the purpose of describing, and not limiting the invention. Various modifications, which will become apparent to one skilled in the art, are within the scope of this invention described in the attached claims.

What is claimed is:

1. An exterior siding member comprising a plurality of individual fibercement layers affixed to a rigid support member, wherein the individual fibercement layers comprise a curable non-gypsum cementitious material having fibers therein, and the layers are adhered to one another by one or more of interlaminar bond strength promoters, wherein one of the one or more interlaminar bond strength promoters comprises nano-sized magnesium alumino silicate and an acrylic based resin and water, wherein a ratio of the acrylic based resin to water is 5% to 50%.

2. A cement-containing exterior siding member comprising:
(a) an elongated rigid support member comprising steel, said rigid support member having a wall-facing side and an exterior-facing side and a plurality of fastener receiving holes disposed therethrough; and
(b) a cement-containing layer bonded to said rigid support member, said cement-containing layer comprising a plurality of individual fibercement layers wherein the individual fibercement layers comprise a curable non-gypsum cementitious material having fibers therein, and the fibercement layers are adhered to one another by one or more of interlaminar bond strength promoters, wherein one of the one or more interlaminar bond strength promoters comprises nano-sized magnesium alumino silicate and an acrylic based resin and water, and wherein the cement-containing layer comprises an outwardly facing exterior-facing side.

3. The cement-containing exterior siding member of claim 2, wherein said rigid support member comprises galvanized steel lath or galvanized and perforated steel sheet or plate.

4. The cement-containing exterior siding member of claim 2, further comprising a resinous cement bond promoter to assist in bonding said cement-containing layer to said rigid support member.

5. The cement-containing exterior siding member of claim 2, wherein said cement-containing layer comprises cellulosic fiber, silica sand, portland cement or a combination thereof.

6. A cementitious exterior sheathing product comprising:
(a) a rigid metal support member having a wall-facing side and an exterior-facing side, a nail flange disposed along at least one of its outer edges, and a plurality of perforations defined through the rigid metal support member; and
(b) a cementitious layer bonded to said rigid support member, the cementitious layer extending through the plurality of perforations to lock said cementitious layer to said rigid support member, said cementitious layer comprising a plurality of individual fibercement layers wherein the individual fibercement layers comprise a curable non-gypsum cementitious material having fibers therein, and the fibercement layers are adhered to one another by one or more of interlaminar bond strength promoters, wherein one of the one or more interlaminar bond strength promoters comprises nano-sized magnesium alumino silicate and an acrylic based resin and water, wherein the cementitious layer exhibits a wood grain appearance.

7. A cementitious exterior sheathing product comprising:
(a) a rigid metal support member having a wall-facing side and an exterior-facing side, a nail flange disposed along at least one of its edges, and a plurality of perforations defined through the rigid metal support member; and
(b) a cementitious layer disposed at least on a portion of said rigid support member and being laterally spaced apart from said nailing flange, the cementitious layer extending through the plurality of perforations to lock said cementitious layer to said rigid support member, said cementitious layer comprising a plurality of individual fibercement layers, wherein the individual fibercement layers comprise a curable non-gypsum cementitious material having fibers therein, and the fibercement layers are adhered to one another by one or more of interlaminar bond strength promoters, wherein one of the one or more interlaminar bond strength promoters comprises nano-sized magnesium alumino silicate and an acrylic based resin and water, wherein the cementitious layer exhibits a wood grain appearance, and said metal support member is at least partially embedded within said cementitious layer.

8. An exterior siding member comprising:
(a) a plurality of individual fibercement layers, wherein the individual fibercement layers comprise a curable non-gypsum cementitious material having fibers therein, and the fibercement layers are adhered to one another by one or more of interlaminar bond strength promoters, wherein one of the one or more interlaminar bond strength promoters comprises nano-sized magnesium alumino silicate and an acrylic based resin and water;
(b) a rigid support member having a plurality of perforations defined therethrough, the cementitious material extending through the plurality of perforations to lock said fibercement layers to said rigid support member, the rigid support member also being bonded to one or more of the individual layers of the plurality of fibercement layers, the rigid support member having a wall-facing side and a nailing flange, wherein the nailing flange comprises a fastener receiving portion to receive fasteners for attaching the wall-facing side to a building;
wherein an exterior face of the siding member comprises a press imprinted wood grain texture.

* * * * *